R. S. BRYANT.
RIM FOR VEHICLE WHEELS.
APPLICATION FILED JULY 9, 1914.
1,313,981. Patented Aug. 26, 1919.
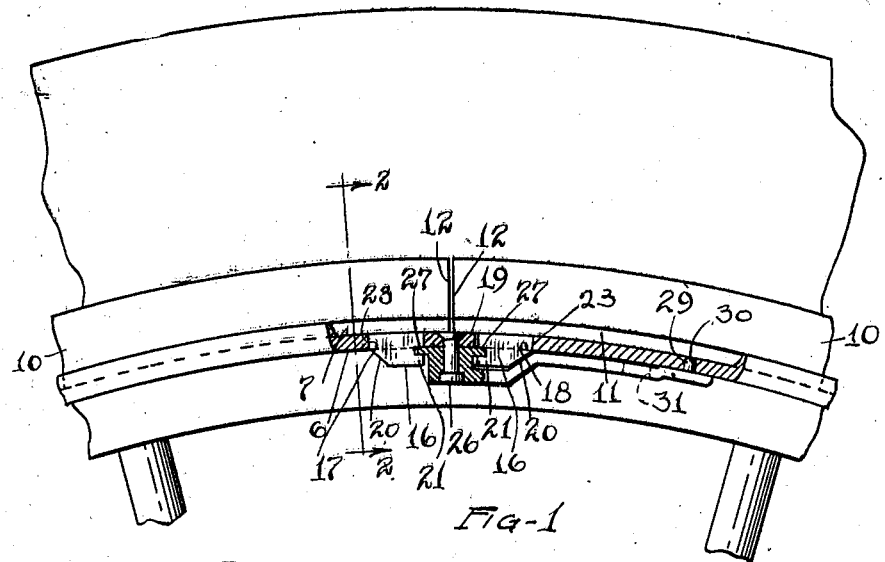
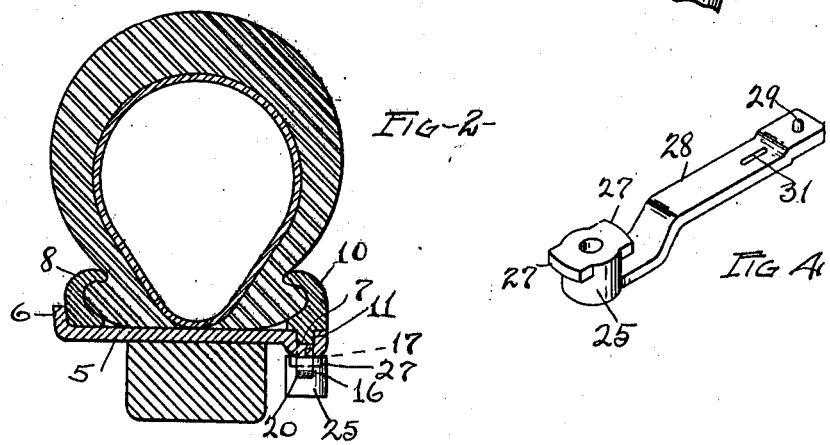
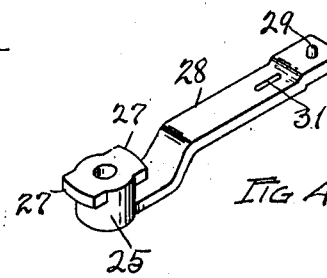
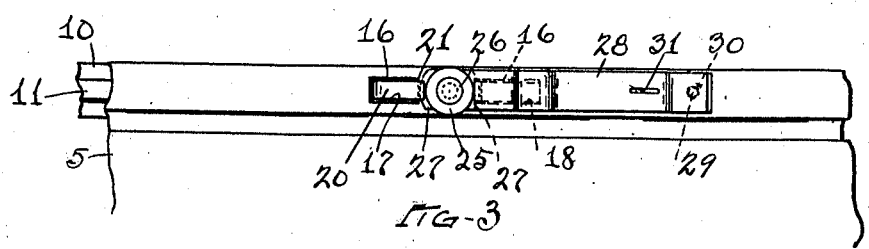
WITNESSES:
O. M. Kappler
Thos. H. Fay
INVENTOR
Richard S. Bryant
BY Fay and Oberlin
ATTORNEYS

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE-WHEELS.

1,313,981.  Specification of Letters Patent.  Patented Aug. 26, 1919.

Original application filed April 25, 1912, Serial No. 693,078. Divided and this application filed July 9, 1914. Serial No. 849,865.

*To all whom it may concern:*

Be it known that I, RICHARD S. BRYANT, a citizen of the United States, and a resident of Cleveland, county of Cuyahoga, and State of Ohio, have invented a new and useful Improvement in Rims for Vehicle-Wheels, of which the following is a specification, the principle of the invention being herein explained and the best mode in which I have contemplated applying that principle, so as to distinguish it from other inventions.

The present improvements, relating, as indicated, to rims for vehicle wheels, have more particular regard to tire-supporting rims of the kind largely used on automobiles and like vehicles, wherein one of the side flanges utilized to retain the tire in place on the rim is rendered detachable. Accordingly, by simply detaching such side flange the tire may be readily removed from the rim and another one put on in its place.

The objects of the invention include the provision of novel and simplified mechanism for the secure attachment of such detachable flange to the rim with which it is used; the provision of attaching means which may be readily disconnected when occasion shall arise, without the necessity for the employment of any special tools, and which shall be proof against accidental disconnection or derangement; and the provision of securing means which are permanently attached either to the rim or to the flange, so that there is no danger of parts being lost or mislaid. To the accomplishment of the foregoing and related ends, the invention, then, consists of the means hereinafter fully described and particularly pointed out in the claims, it being noted that the present case is a division of my co-pending application filed April 25, 1912, Serial No. 693,078, and that the claims are accordingly directed only to the divisible subject matter.

The annexed drawing and the following description set forth in detail certain mechanism embodying the invention, such disclosed means constituting, however, but one of various mechanical forms in which the principle of the invention may be used.

In said annexed drawing:

Figure 1 represents a side elevation of a portion of a vehicle wheel having a rim made in accordance with my invention, the latter being shown with parts broken away to more clearly reveal the construction; Fig. 2 is a cross-section of the same taken on the line 2—2, Fig. 1; Fig. 3 is a plan view of a portion of the rim viewed from the inside, showing the side-flange locking means in operative position; and Fig. 4 is a perspective view of the securing latch forming part of such locking means.

As illustrated in the several figures of the drawings, the rim consists of the usual annular metallic member 5 having at one side the outwardly projecting flange 6, and having its opposite lateral portion depressed to form a groove 7. Surrounding the rim adjacent to the flange 6 is a loose ring or side flange 8, the two sides whereof may be shaped to conform substantially to the sides of tires of the clencher and straight-wall types now most widely used. Surrounding the rim 5 adjacent to the opposite edge thereof is a removable or detachable flange 10 having a base portion 11 adapted to fit securely within the groove 7. The groove 7 and base portion 11 of the flange are shown as made of symmetrical shape so as to permit the flange to be reversed with respect to the rim, the opposite faces of the projecting portion of the flange being shaped similarly to the two faces of the loose ring 8.

The detachable ring or flange is transversely split at one point in its circumference, the ends 12 being designed to closely abut when the ring is properly seated in the groove 7. Formed upon the inner surface of the ring adjacent to each such end is a lug 16, the bottom of the groove being interrupted or preferably formed with two apertures 17 and 18 for the reception of these lugs, such apertures being made of the same length, although in the case of a non-reversible flange their lengths may be different if desired. Where two flanges are provided as shown, they will be separated by a web 19, the upper surface of which forms a continuation of the bottom wall of the groove 7.

The bodies of the lugs are made substantially radial and of a size approximately to fill the apertures in which they are designed to be inserted, their rearward faces 20 being beveled for the major portion of their height to facilitate their being drawn together, as will be presently explained, the portion 23 of each lug immediately adjacent to the inner periphery of the ring being preferably left abrupt so as to abut firmly against the end wall of the corresponding aperture. The forward face of each lug, that is the side nearest the corresponding end 12 of the ring 10, is notched so as to leave a forwardly projecting toe 21, the toe of each lug projecting toward the toe of the opposite lug when such lugs are inserted in the apertures 17 and 18, and also being spaced inwardly of the inner surface of the rim.

Mounted upon a suitable pivot 26 between the aforesaid apertures is a latch member 25 having at each side a lip 27 adapted to be inserted beneath the corresponding toe 21. This latch member also has an extended resilient handle 28 adapted to overlie one of the projections 16, the end of the handle being provided with a stud 29 adapted to spring into a recess 30 formed in the bottom wall of the groove 7. The handle is also illustrated as formed with a slot or recess 31 for the reception of a prying tool such as the blade of a screwdriver or the like, whereby the same may be sprung out of engagement with the rim and turned to one side. The major portion of this handle is preferably offset slightly from the rim as shown at 32 so as to prevent the parts from corroding together at this point.

The method of attaching or detaching the transversely split side flange 10 should be obvious from the foregoing description of the flange ends and the coöperative securing means. Thus the two ends are readily removable as soon as the latch is disengaged from the projections or lugs without reference to the order in which such lugs are removed from the corresponding apertures. The lugs and apertures, as well as the toes on the lugs, being symmetrical, and the flange, including its base, being reversible, it is obvious that such flange can be applied to the rim with either face directed inwardly. The application of the flange involves the introduction of one or the other of the lugs in the appropriate aperture, whereupon the body of the flange is seated progressively in the groove until the other lug is reached. The inner end of such lug can be readily brought into engagement with the remaining aperture, and under the influence of slight pressure on the end of the rim will slip properly into place owing to the camming action of the inclined portion taken in connection with the contracting tendency of the ring. The first lug, as well as the second lug, when thus fully seated in their corresponding apertures, tend to remain thus seated by reason of the engagement of the abrupt portions of such lugs with the end walls of the apertures as has been already explained. When the lugs are thus properly inserted in the apertures, the pivotal latch may be readily swung into operative position, that is with the handle 28 alined with the ring, in which position the lips 27 enter the notches in the forward faces of the lugs so as to interlock with the toes on such lugs and thus securely hold the ends of the ring in place.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle rim, in combination, an annular member adapted to be secured about the felly of a wheel and having a pair of slots therethrough separated by a transverse web, a split ring adapted to surround said member and having adjacent to each of its ends a projection adapted to enter one of said slots, each of said projections having a notch in its forward end, and latch means pivoted to said web between said slots for engaging said notches and holding said projections in their respective slots.

2. In a vehicle rim, the combination of an annular, radially apertured tire-supporting member, a split ring adapted to surround said member and having lugs at its ends adapted to project through the same, the height of said lugs being greater than the thickness of said member and the rearward faces of said lugs having abrupt shoulders adjacent to the inner surface of the ring, the height of said shoulders being substantially equal to the thickness of the member and the remainder of such rear faces being inclined, forwardly projecting toes carried by said lugs, and securing means adapted to be inserted between said toes and the inner face of said annular member adjacent to said lugs, whereby the withdrawal of the latter is prevented.

3. In a vehicle rim, the combination of an annular, radially apertured tire-supporting member, a split ring adapted to surround said member and having lugs at its ends adapted to project through the same, the height of said lugs being greater than the thickness of said member and the rearward faces of said lugs having abrupt shoulders adjacent to the inner surface of the ring, the height of said shoulders being substantially equal to the thickness of the member and the remainder of such rear faces being inclined, forwardly projecting toes carried by said lugs, and a latch pivoted on said rim and adapted in one position to interlock with the toes on said lugs, whereby the withdrawal of the latter is prevented.

4. A device of the class described, including a rim provided in its outer face with a circumferential groove defining a rib at the inner face of the rim, a split ring mounted on the rim and provided with terminal lugs extending through the rim and projecting at the inner face thereof, said lugs being provided with opposed recesses, a rotary locking member pivoted to the rim between the said lugs and rotatable on an axis radial to the rim, said locking member being provided with a substantially oblong head adapted to be turned by a rotary movement on the locking member into and out of the recesses of said lugs, and an operating arm secured to the inner end of the locking member and arranged to engage with the rib of the rim to retain the locking member in its locked position.

5. A device of the class described, including a rim provided with spaced openings, a split ring mounted on the rim and provided with terminal lugs extending through the openings of the rim and exposed at the inner side of the rim, said lugs being provided with opposite recesses, a rotary locking member pivoted to the rim between the said lugs and having its axis radial to the rim, said locking member being provided with a substantially oblong head adapted to engage the said recesses of the lugs, and an operating arm secured to the locking member and adapted to turn the same into and out of engagement with the lugs of the split ring.

6. In a vehicle rim, the combination with an annular, tire-supporting member having a pair of radial aperture therethrough and a web between said apertures, a split ring adapted to surround said member and having a lug adjacent to each of its ends, one of said lugs being adapted to project through each of said apertures, and a latching member pivoted to said web and having portions adapted to engage the forward faces of both lugs, whereby the withdrawal of said lugs is prevented.

Signed by me, this 6th day of July, 1914.

RICHARD S. BRYANT.

Attested by—
C. J. LEITH,
R. C. COOLEY.